Jan. 2, 1962     J. D. BUCHANAN ETAL     3,015,317
PRESSURE CONTROL SERVO VALVE
Filed Feb. 11, 1958
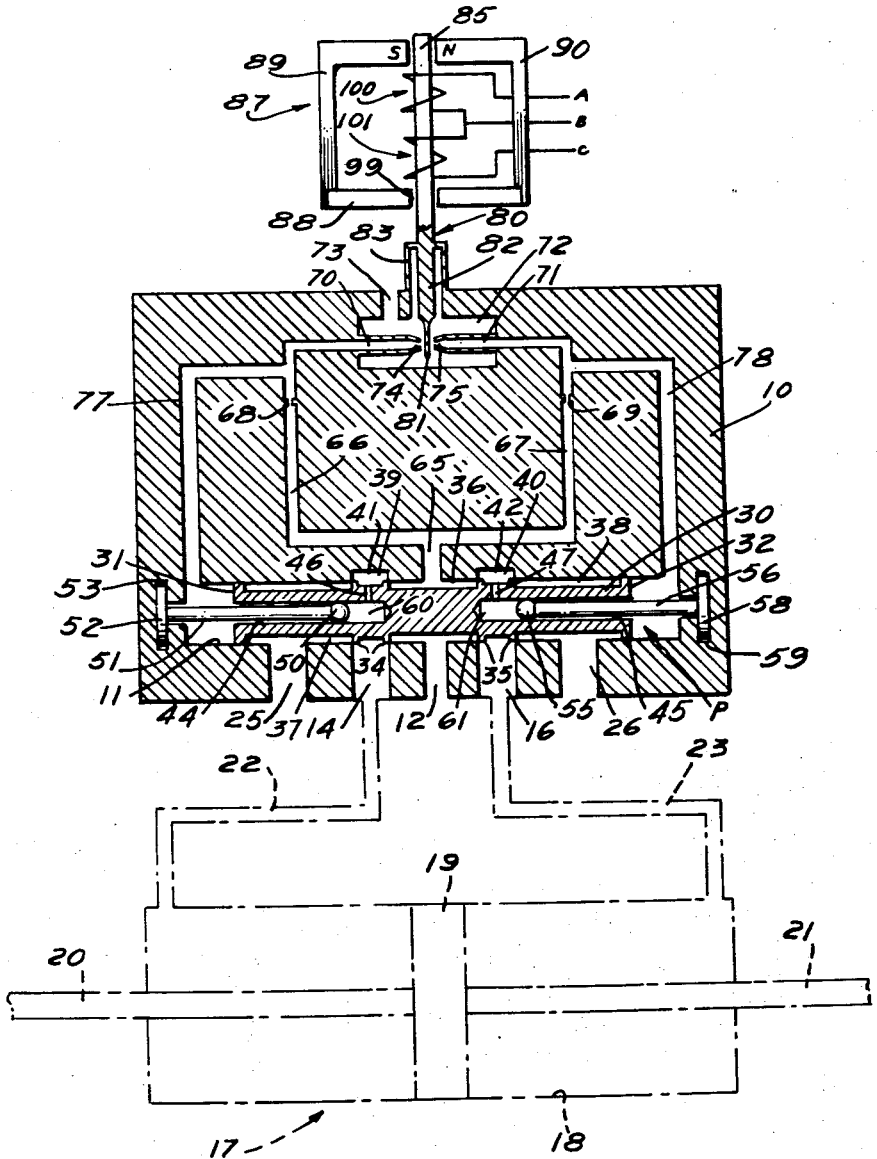
J. D. BUCHANAN,
BERT SMITH, JR.,
      INVENTORS.
WHANN & McMANIGAL
*Attorneys for Applicant*

United States Patent Office 3,015,317
Patented Jan. 2, 1962

3,015,317
PRESSURE CONTROL SERVO VALVE
J. D. Buchanan, Burbank, and Bert Smith, Jr., Los Angeles, Calif., assignors to Hydraulic Research and Manufacturing Company, Burbank, Calif.
Filed Feb. 11, 1958, Ser. No. 714,650
7 Claims. (Cl. 121—46.5)

This invention relates generally to servo mechanisms and relates more particularly to servo mechanisms for hydraulic control systems.

While the invention has particular utility in connection with the control of hydraulic actuators and the like, and is shown and described in such connection, it is to be understood, of course, that its utility is not confined thereto.

The control of hydraulic actuators by servo valve mechanisms involve certain problems such as the maintenance of a substantially constant pressure to such actuators and it is, therefore, an object of the present invention to provide a servo valve control which will overcome such problems.

It is another object of the present invention to provide a pressure control servo valve mechanism which will hold substantially constant pressure differential, regardless of fluid flow, within the limits of the specific valve.

Still another object of the invention is to provide a device of this character wherein the threshold is very low.

A further object of the invention is to provide a device of this character having a high degree of stability and not subject to oscillation.

A still further object of the invention is to provide a device of this character that is relatively simple in construction and inexpensive and easy to manufacture.

The characteristics and advantages of the invention are further sufficiently referred to in connection with the following detailed description of the accompanying drawing which represents one embodiment. After considering this example, skilled persons will understand that variations may be made without departing from the principles disclosed and we contemplate the employment of any structures, arrangements, or modes of operation that are properly within the scope of the appended claims.

Referring to the drawing there is diagrammatically shown a servo valve mechanism embodying the present invention.

Referring more particularly to the drawing, there is shown a housing 10 having a bore or cylinder 11 therein for a power valve, indicated generally at P.

There are various fluid connections with the bore 11, including a pressure fluid inlet port 12 which communicates with said bore 11 at substantially the longitudinal center thereof although it may be positioned at any other suitable location in the cylinder 11. Spaced outwardly of the port 12 are actuator fluid ports 14 and 16 which communicate with the bore 11 in outwardly spaced relationship respectively from the port 12, said ports 14 and 16 being adapted to be connected to an actuator or the like, indicated generally at 17 in dot dash lines. The actuator 17 comprises a cylinder 18 having a piston 19 therein for reciprocal movement in said cylinder and having a pair of oppositely extending, axially arranged piston rods 20 and 21. Port 14 is connected by means of a conduit 22 with one end of the cylinder 18 and port 16 is connected by a conduit 23 with the opposite end of said cylinder.

Spaced outwardly of each of the ports 14 and 16 are return ports 25 and 26 which are adapted to be connected to a reservoir or the like to which the pressure fluid is returned for supplying pressure fluid to the pressure supply pump, not shown.

The valve P comprises a cylindrical body 30 of less length than the length of the bore 11, said body being provided with respective outwardly extending flanges 31 and 32 snugly but slidably fitting the bore 11. Spaced inwardly of the flange 31 are a pair of longitudinally spaced flanges 34 which are spaced apart from each other longitudinally with respect to the body 30. Spaced inwardly of the flange 32 are a similar pair of flanges 35 which are also spaced apart from each other longitudinally with respect to the body and the inner flanges 34 and 35 are spaced apart longitudinally with respect to each other. Flanges 34 and 35 are operably slidable within the bore 11.

Between the adjacent inner flanges 34 and 35 there is an annular chamber or space 36 with which the port 12 communicates intermediate the ends of said chamber. Between the outer flange 34 and the flange 31 is an annular chamber 37 with which the return port 25 communicates, and between the outer flange 35 and the flange 32 there is an annular chamber or space 38 with which the return port 26 communicates. Between the flanges 34 there is an annular space 39 with which the port 14 communicates, and between the flanges 35 there is an annular space 40 with which the port 16 communicates. When the valve P is in the normal neutral, central position the flanges 34 are so positioned as to cut off communication between the bore 11 and the port 14 and similarly the flanges 35 cut off communication between the bore 11 and the port 16. Bore 11 has a pair of annular grooves 41 and 42 which are longitudinally spaced apart and which are normally cut off from communication with the bore 11 when said valve P is in the above referred to neutral position.

Valve body 30 is provided with axial bores 44 and 45 which extend inwardly from the respective ends of said valve body. The inner ends of said bores are connected with the exterior of the valve body by means of cross bores 46 and 47 having their outer ends terminating between the respective pairs of flanges 34 and 35.

The bore 44 is provided with a piston 50 on a piston rod 51 secured by any suitable means to the housing or body 10 and held against longitudinal movement so that the cylindrical body 30 is free to move relative to the housing 10 and piston 51. Bore 45 is provided with a similar piston, indicated at 55, which is on a piston rod 56 secured at the outer end thereof to said housing. It is to be noted that the piston 50 is spaced outwardly of the inner end of the bore 44 to provide a chamber 60 at the inner end of said bore with which the cross bore 46 communicates. The bore 45 has a similar chamber 61 at its inner end with which the cross bore 47 communicates.

From the longitudinal center of the bore 11 there extends a passage 65 having branch passages 66 and 67 which extend upwardly, as shown in the drawing, and which are provided with calibrated, restricted orifices 68 and 69 respectively. Pressure fluid flows from the bore 11 into the passage 65 and branch passages 66 and 67, said branch passages being connected with respective nozzles 70 and 71 which extend inwardly toward each other in a chamber 72 provided with a return port 73 adapted to be connected to a return conduit, not shown, for returning pressure fluid to the above referred to reservoir or the like. Nozzles 70 and 71 extend toward each other in axial alignment and the adjacent ends of said nozzles are provided with restricted outlet openings 74 and 75 respectively which are spaced apart. Branch passages 66 and 67 are connected to the respective outer ends of the bore 11 by means of conduits 77 and 78 which communicate with said branch passages 66 and 67 downstream of the respective orifices 68 and 69. Thus, pressure fluid may be supplied to the ends of the valve P by way of the passage 65, branch passages 66 and 67 and conduits 77 and 78.

The discharge of fluid from the nozzles 70 and 71 is controlled by a flapper valve, indicated generally at 80, and including a free end member 81 which is normally disposed midway between the adjacent ends of said nozzles 70 and 71 when said flapper valve is in the neutral position. The member 81 is connected to the lower end of a rod 82 operably secured in an isolation diaphragm 83 which serves as a hinge port for the flapper valve. This isolation diaphragm may be of any suitable type such as is shown, for example, in the Baltus et al. application, Serial No. 647,255, filed March 25, 1957 now Patent No. 2,947,285 issued on August 2, 1960. The stem 82 is provided at its outer end with an armature 85 in axial alignment with said stem.

Flapper valve 80 is controlled by a torque motor, indicated generally at 87. Motor 87 is of the usual well-known type and comprises a permanent magnet 88 with which pole pieces 89 and 90 are operably associated. There is an opening 99 in the magnet 88 through which the stem or armature 85 extends, said opening 99 being of sufficient size to permit operative movements of the armature. The upper ends of the pole pieces 89 and 90 extend toward each other and comprise south and north poles respectively which are spaced apart and between which the upper end portion of the armature 85 extends, there being sufficient spacing between the pole pieces to permit operative movements of said armature. Coils or windings 100 and 101 are operably disposed on the armature 85, the coil 100 being included in the circuit A, B and the coil 101 being included in the circuit B, C. The coils 100 and 101 are loosely disposed on the armature so as to permit operative movements of the latter upon energization of one or the other of the coils to effect movement of the armature in one direction or the other so as to cause the flap valve member 81 to move toward or away from the opposite nozzles 70 and 71 to thereby control the discharge of fluid therefrom and hence control the fluid pressure at opposite ends of the valve P.

Normally, the fluid pressures applied to the respective opposite ends of the valve P are equal. When the torque motor 87 is operated to effect movement of the armature, these pressures are unbalanced. Should the torque motor be operated to cause the armature 85 to move in a clockwise direction, the valve member 81 will move toward the opening 74 of the nozzle 70 and restrict the outflow of fluid therefrom. There will then be a build-up or increase of pressure in the passage 77 and hence, in the left-hand end portion, as shown in the drawing, of the bore 11. The differential of pressure at opposite ends of the valve P will then be unbalanced to effect rightward movement of said valve. The inner flange 35 will then clear the adjacent edge of port 16 and the outer flange 34 will clear the adjacent edge of the port 14. Pressure from the port 12 and chamber 36 will pass into port 16, conduit 23 and thence to the end of the actuator with which said conduit is connected. Such pressure will also pass into the annulus 42 and thence into the cross bore 47 and the inner end portion 61 of the bore 45. The pressure in chamber 61 will be effective on the inner end of the bore 45 to urge the valve P leftwardly and this pressure, and the pressure in the right-hand end of the bore 11 acting on the adjacent end of the piston P will substantially balance the pressure applied to the opposite end of said valve and maintain said valve in a stationary position with the pressure transmitted to the actuator 17 at a substantially constant predetermined value. The pressure transmitted by conduit 23 to the right-hand end of cylinder 18 will effect leftward movement of the piston 19 and fluid in the left-hand end of cylinder 18 will pass through the conduit 22, port 14, into the chamber 37 and thence through the return port 25. When the current to the torque motor is cut off, the flapper valve 80 will return to the normal neutral position. The fluid pressure on the ends of the valve P will then return to normal whereat they are of equal value. However, the counterbalancing pressure in the inner end portion 61 of the bore 45 will still be effective and will effect return of the valve P to its neutral position whereupon the connection between chamber 36 and the annular chamber 42 will be cut off so that further movement of valve P will stop. Fluid flow relative to the cylinder 18 will then be cut off and the piston 19 will be held in the position to which it has been moved. Movement of the piston in the opposite direction will be effected by actuation of the flapper valve 80 in the opposite direction with respect to the nozzles.

It is thought that the invention and many of its attendant advantages will be understood from the foregoing description and it is thought that it will be apparent that various changes may be made in the form, construction and arrangement of the parts of the invention without departing from the spirit and scope thereof or sacrificing all of its material advantages, the embodiment hereinbefore described being merely for the purposes of illustration.

We claim:

1. A control mechanism for a hydraulic control system, comprising: a valve mechanism including a housing having a cylinder therein; a valve member slidably disposed in said cylinder, said valve member including a body having flanges thereon defining in said body a central annular chamber receiving pressure fluid from a source of pressure, an annular actuator fluid chamber at each side of said central chamber, and an annular fluid return chamber spaced outwardly of each actuator fluid chamber, said cylinder having a central pressure fluid inlet port communicating with said central chamber, an actuator fluid port spaced axially outwardly of said central chamber for connection with the opposite ends of the cylinder of an actuator device and communicating with the respective actuator fluid chambers, there being a recess in the wall of the cylinder forming a chamber connected with said actuator fluid chambers, a return port spaced outwardly of each of the actuator fluid ports and communicating with the respective return chambers, said valve body having a bore extending longitudinally inward from each end and closed at the inner end, the inner end of each bore being connected with the adjacent actuator fluid chamber; a pressure holding piston operably disposed in each bore and mounted against independent movement, slight movement of the valve in either direction resulting in communication between the central chamber of the valve body and the respective adjacent port, connecting the other adjacent port with a respective return port, and connecting said central chamber with the actuator fluid chamber next thereto in the direction of movement of said valve member; means connecting the respective ends of said cylinder with pressure fluid; means for maintaining the pressures at the ends of said cylinder at substantially the same value so that said pressures are balanced against said valve ends; and means for unbalancing said pressure to effect movement of said valve member.

2. In a control mechanism for a hydraulic control system: a valve mechanism including a housing having a cylinder therein, said cylinder having a central pressure fluid supply port, an actuator pressure fluid port at each side thereof in outwardly spaced relation thereto and a return port spaced outwardly of each of said actuator supply ports; a valve member slidably mounted in said cylinder and so contoured as to close the actuator supply ports and the return ports when in a normal neutral position and movable longitudinally to connect the central port with one of the actuator supply ports and connect the other actuator supply port with a return port, said valve member having an axial bore extending inwardly from each end, each bore having a connection at the inner end with the exterior of said valve member whereby fluid pressure from said central port is transmitted to the inner end of respective bores in the direction of valve member movement when said valve member is moved; a piston in each of said bores, each piston comprising a ball spaced outwardly of the inner end of its bore; means securing each piston to the housing and holding same against movement, said housing having a fluid chamber; a pair of oppositely arranged nozzles having their inner ends opening in said chamber and spaced apart from each other; respective branch passageway means connecting said nozzles with pressure fluid, each of said branch passageway means having a restricted calibrated orifice therein; passageway means connected at one end with the respective branch passageway means downstream of the orifice therein and connected with the respective ends of said cylinder; flapper valve means having a part operably disposed midway between the adjacent ends of said nozzles and adapted to be moved toward and away from said nozzles for controlling the outflow of fluid therefrom; and torque motors means for actuating said flapper valve means.

3. In a control mechanism for a hydraulic control system: a housing having a cylinder therein, said cylinder having a central pressure fluid supply port, an actuator pressure fluid port at each side thereof in outwardly spaced relation thereto and a return port spaced outwardly of each of said actuator supply ports; a valve member slidably mounted in said cylinder and so contoured as to close the actuator supply ports and the return ports when in a neutral position and movable longitudinally to connect the central port with one of the actuator supply ports and connect the other actuator supply port with a return port, said valve member having an axial bore extending inwardly from each end, each bore having a connection at the inner end with the exterior of said valve member whereby when said valve member is moved, fluid pressure from said central port is transmitted to the inner end of respective bores in the direction of valve member movement; a piston in each of said bores, each piston comprising a ball being spaced outwardly of the inner end of its bore; means securing each piston to the housing and holding same against movement; means subjecting the respective ends of said valve member to balanced fluid pressures; and means for unbalancing said pressures to effect movement of said valve member.

4. In a control mechanism for a hydraulic control system: means defining a cylinder having a pressure fluid inlet port, actuator pressure fluid ports and fluid return ports; a valve member slidably mounted in said cylinder and so contoured as to close the actuator supply ports and the return ports when in a neutral position and movable longitudinally to connect the inlet port with one of the actuator supply ports and connect the other actuator supply port with a return port; means subjecting each end of said valve member to fluid pressure, the fluid pressure at one end being balanced relative to the pressure at the opposite end; means for unbalancing said pressures to effect operative movement of said valve member; and means for subjecting said valve member when same has been moved, to a counterbalancing static fluid pressure urging said valve member in the opposite direction with a force to effect substantial balancing of the higher of the first mentioned fluid pressures by said counterbalancing pressure and the lower of said first mentioned fluid pressures, said means comprising bores in said valve member connected with respective supply ports, and ball pistons operably disposed in respective bores.

5. In a valve mechanism: means defining a cylinder having fluid pressure connections; a valve member operably disposed in said cylinder and having a neutral position; means for subjecting the ends of said valve member to fluid pressure of equal value; means for unbalancing said pressure so that the valve member will be actuated in accordance with the differential of pressures at opposite ends; and means for subjecting said valve member to a counterbalancing static pressure opposing the higher of the pressures acting on the ends of the valve member, said counterbalancing fluid and the lower of said pressures substantially balancing said higher pressure, said means for subjecting said valve member to the counterbalancing static pressure comprising bores extending longitudinally inwardly of the ends of said valve member, connected at their inner ends with said fluid pressure connections, self-centering pistons operably disposed in respective bores; and support means for said pistons, said support means having the outer ends thereof fixed.

6. In a control mechanism for a fluid pressure control system: means defining a cylinder having a pressure fluid inlet port, actuator pressure fluid ports and fluid return ports; a valve member slidably mounted in said cylinder and so contoured as to close the actuator supply ports and the return ports when in a neutral position and movable longitudinally to connect the inlet port with one of the actuator supply ports and connect the other actuator supply port with a return port, said valve member having a bore extending inwardly from each end and closed at the inner end, each bore having a connection adjacent its inner end with a respective actuator port; means subjecting each end of said valve member to fluid pressure, the fluid pressure at one end being balanced relative to the pressure at the opposite end; a ball piston operably disposed in each of said bores; and means securing each piston to the housing and holding same against movement, said means being of smaller cross sectional size than its piston.

7. In a valve mechanism: means defining a cylinder having fluid pressure connections; a valve member operably disposed in said cylinder and having a neutral position, said valve member having a bore extending inwardly from each end and closed at the inner end, each bore having a connection at its inner end with the exterior of the valve member; a ball shaped piston in each bore having operable engagement with the walls of the bore; and means for securing each piston against movement, said means being of smaller cross sectional size than the cross sectional size of the bore in which it is received.

References Cited in the file of this patent
UNITED STATES PATENTS

| | | |
|---|---|---|
| 580,848 | Currie | Apr. 20, 1897 |
| 2,536,965 | Taylor | Jan. 2, 1951 |
| 2,709,421 | Avery | May 31, 1955 |
| 2,823,689 | Healy | Feb. 18, 1958 |
| 2,835,265 | Brandstadter | May 20, 1958 |
| 2,836,154 | Lantz | May 27, 1958 |
| 2,841,168 | Levetus et al. | July 1, 1958 |
| 2,904,055 | Witherell | Sept. 15, 1959 |